United States Patent [19]

Moakler et al.

[15] 3,652,866
[45] Mar. 28, 1972

[54] IN-PHASE MONITOR FOR DETERMINING IN-PHASE CONDITION OF TWO SEPARATE ALTERNATING CURRENT SOURCES

[72] Inventors: William A. Moakler, Basking Ridge; Ralph H. Ringstad, Whippany, both of N.J.

[73] Assignee: Automatic Switch Company

[22] Filed: Sept. 14, 1970

[21] Appl. No.: 71,694

[52] U.S. Cl. .................................. 307/80, 307/70, 307/64, 318/591
[51] Int. Cl. ......................................................... H02j 3/00
[58] Field of Search ..................... 307/70, 80, 64, 85, 86, 87, 307/60; 318/591

[56] References Cited

UNITED STATES PATENTS 3,390,275  6/1968  Baker ....................................... 307/64

3,061,736  10/1962  Devine ................................. 307/70 X

Primary Examiner—Herman J. Hohauser
Attorney—Breitenfeld & Levine

[57] ABSTRACT

An in-phase monitor including two switch means, e.g., transistors, each connected to a different AC source. One transistor conducts during alternate half cycles of its respective power source, and the other transistor conducts only when the first transistor is conducting and when the voltages of the power sources are of the same sign. When both transistors conduct, a capacitor is charged, and if the charge becomes high enough a third transistor becomes conductive causing production of an output signal from the monitor. A transfer switch includes a coil and contacts for alternatively connecting a load to one or the other of the power sources, and a circuit for controlling energization of the coil includes a relay responsive to the output signal from the monitor.

10 Claims, 10 Drawing Figures

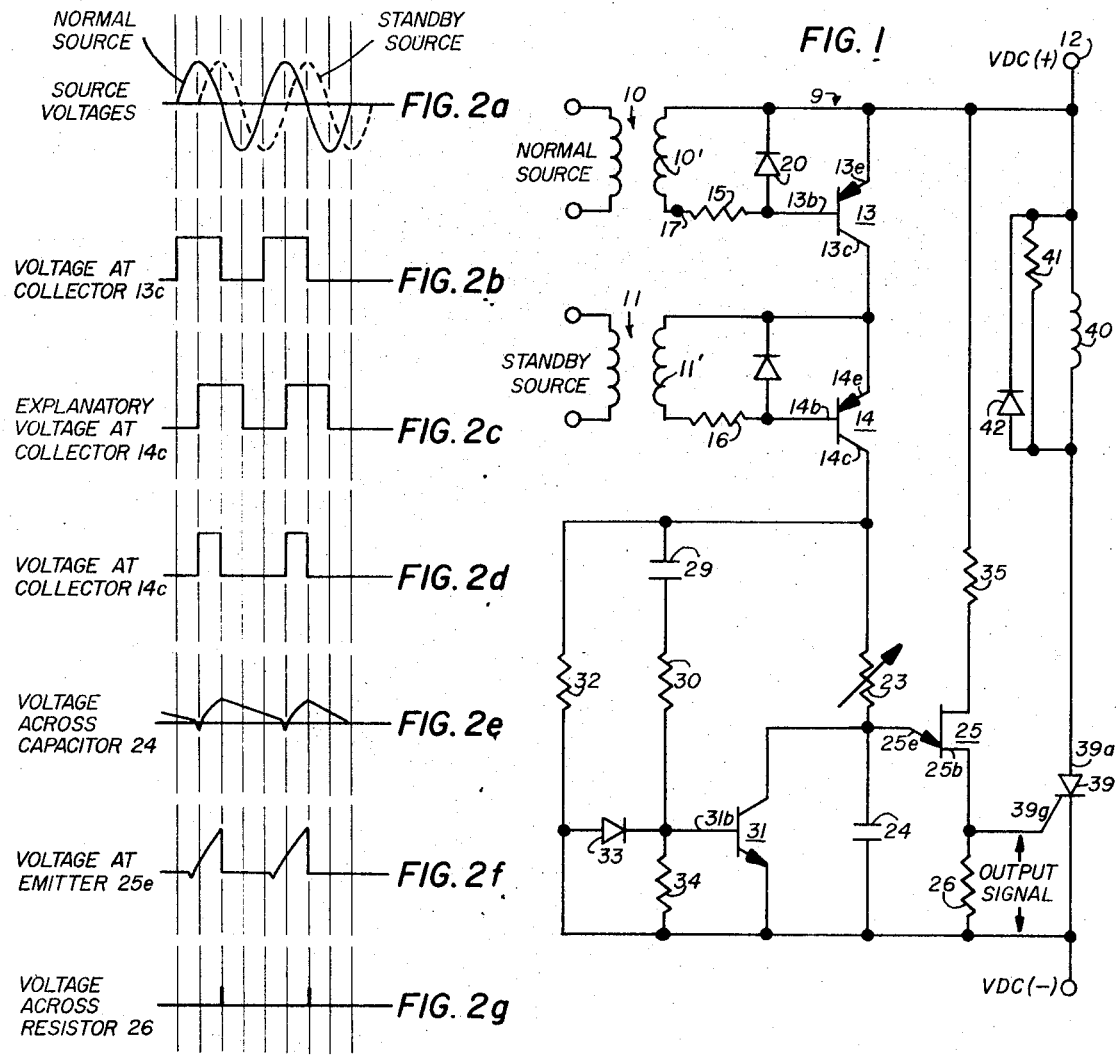

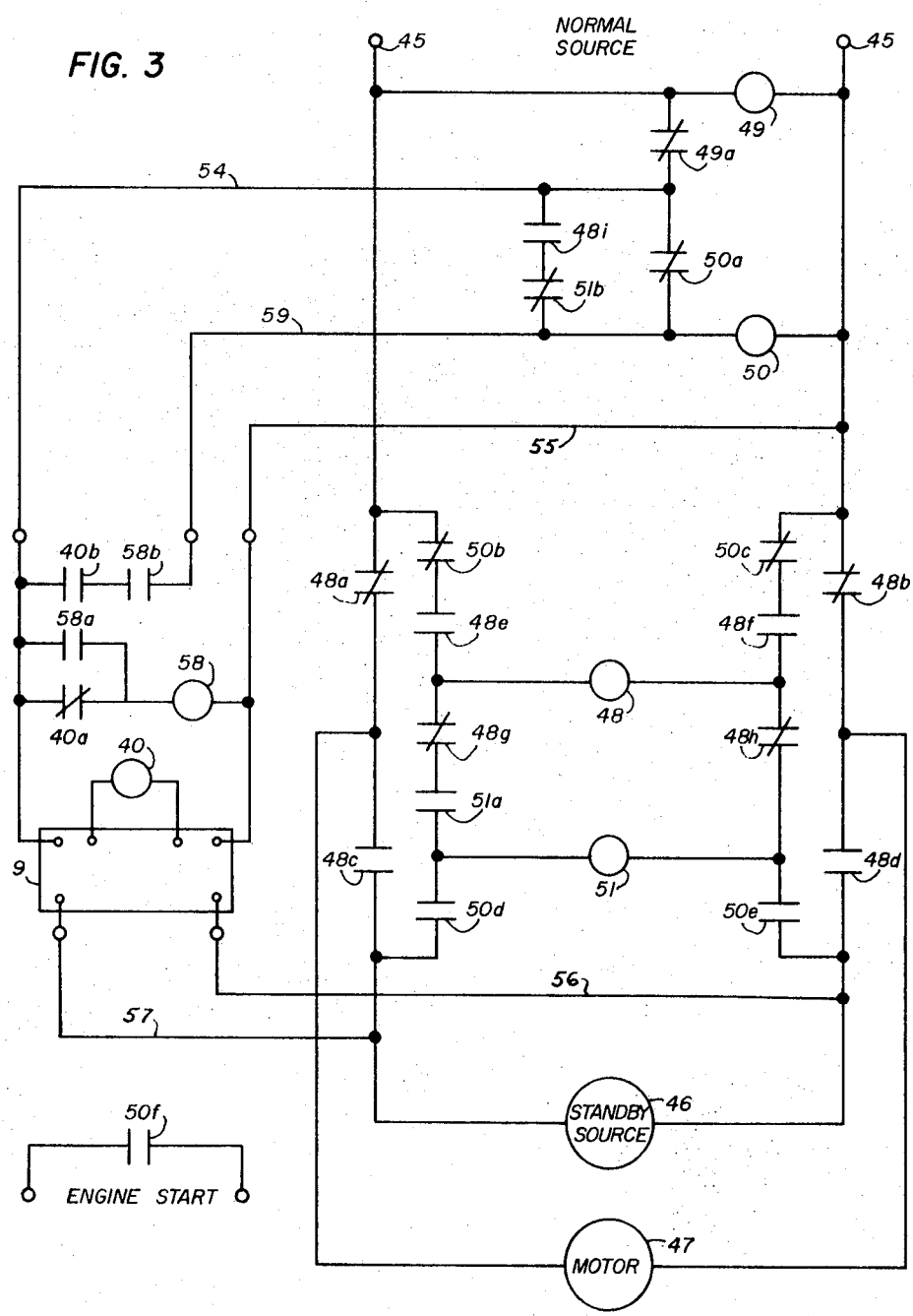

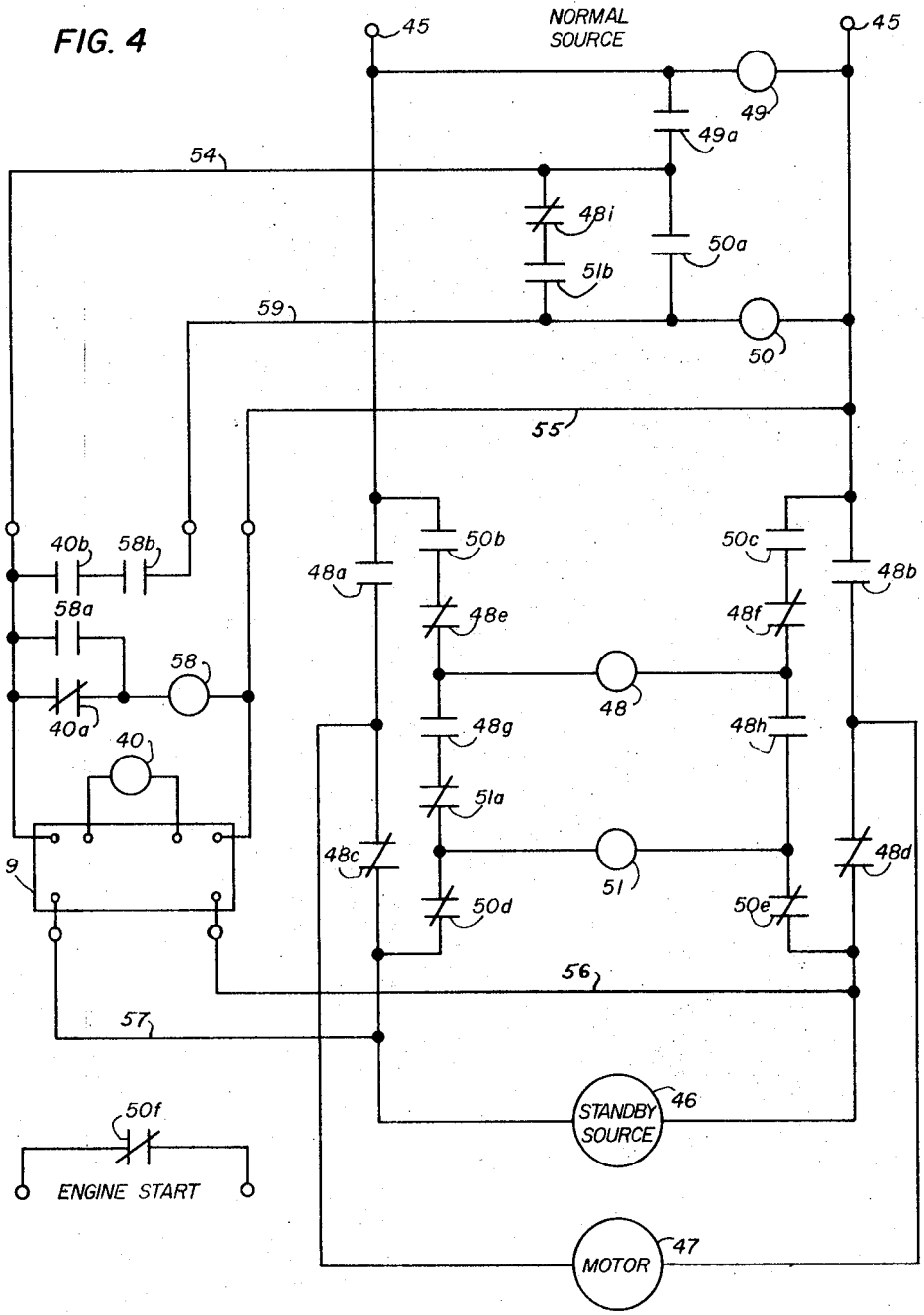

IN-PHASE MONITOR FOR DETERMINING IN-PHASE CONDITION OF TWO SEPARATE ALTERNATING CURRENT SOURCES

This invention relates to monitors for comparing the phase of the voltages of two separate AC power sources, and more particularly to such a monitor capable of controlling the transfer of a load, especially a motor load, from one of the sources to the other.

When a motor is disconnected from a power source, the energy stored in its magnetic field maintains a residual voltage across the motor terminals for a period of time after disconnection, i.e., the disconnected but still rotating motor acts as a generator. A motor load alternatively connected to two power sources (e.g., a normal or utility source and a standby source used when the normal source fails) by a transfer switch is disconnected from one source and reconnected to the other each time the transfer switch is actuated. If the motor is relatively large, its residual voltage is high at the time of disconnection, and if reconnection to the other source is almost instantaneous and the other source is out of phase with the motor residual voltage, an abnormally high inrush current to the motor occurs.

The magnitude of the inrush current is related to the phase of the voltage of the reconnected power source as compared to the phase of the motor residual voltage. As the phase difference between these voltages becomes greater, the inrush current increases correspondingly. Thus, should the residual voltage be 180° out of phase with the reconnected power source voltage, the inrush current can be as high as 20 times the normal motor running current. Such abnormally high inrush currents cause severe electrical and mechanical stress on the motor and equipment rotating with it, and can cause nuisance tripping of protective circuit breakers resulting in shutdown of the equipment.

In the past, this problem has been met by using motor couplings, shafts, and like connections specially designed to withstand the mechanical stresses induced by abnormal inrush currents. An alternative and perhaps more common solution to the problem has been to provide control means which prevent reconnection of a disconnected, but still rotating, motor to a power source until the speed of rotation has slowed sufficiently to reduce the residual voltage of the motor to a value which will cause an inrush current no higher than the normal stalled rotor current. However, with this approach, if the motor is large it may remain disconnected from any power source for an appreciable time. Unfortunately, in many applications, particularly those of a continuous nature, interrupted transfer as just described represents a potential industrial hazard.

It is an object of the present invention to make possible near-instantaneous transfer of a rotary motor from one power source to another without drawing an abnormal motor inrush current.

It is a more general object of the invention to provide a monitor capable of sensing the voltage phase difference between two separate AC sources, and producing an output signal only when that phase difference is within a predetermined minimum value.

It is another object of the invention to control the operation of an automatic transfer switch with such a monitor so that the transfer switch operates, in at least one direction, only if the two power sources between which the transfer switch is located have no more than a minimum voltage phase difference.

It is a further object of the invention to provide such a monitor wherein the predetermined minimum value of voltage phase difference between the two power sources, required to produce an output signal, can be adjusted.

As indicated above, when transferring a motor load from one power source to another, the closer the voltage of the two sources are to being in phase with each other, the smaller the inrush current and resulting mechanical shock experienced by the motor. However, signalling the transfer switch to transfer at exactly the time the two sources are in phase is no guarantee that the motor residual voltage will be in phase with the reconnected source voltage, due to the fact that the transfer switch takes some time to act and the frequency of the two sources may not be the same. Thus, the signal to transfer should be communicated to the transfer switch at a predetermined time in advance of the moment the two voltages become in phase, so that when transfer actually occurs the two voltages will be as close to being in phase as is practically possible.

The present invention accomplishes this by providing a monitor which transmits an output signal to a transfer switch only as the voltages of the two sources cross the border into the predetermined minimum range of phase difference, so that as the transfer switch is actuated the two voltages are still moving toward synchronism.

Additional features and advantages of the invention will be apparent from the following description in which reference is made to the accompanying drawings.

In the drawings:

FIG. 1 is a schematic diagram of a monitor illustrating the present invention;

FIGS. 2a–2g are diagrams illustrating the voltages at various points in FIG. 1;

FIG. 3 is a schematic diagram of a transfer switch and monitor combination, in which the load is connected to the normal source; and FIG. 4 is similar to FIG. 3, but showing the load connected to the standby source.

The monitor 9 chosen to illustrate the present invention is shown, in FIG. 1, provided with transformers 10 and 11, the input or primary of transformer 10 being connected to a normal AC voltage source, which may be an electric utility, and the input or primary of transformer 11 being connected to a standby AC source, which may be an engine-generator set arranged to commence operation when the normal source fails. It will be assumed that both sources are supplying power, as occurs when the standby source is running and the normal source, which previously failed, is restored. At such a time, a transfer is actuated to disconnect a load from the standby source and reconnect it to the normal source.

The monitor is furnished with a DC voltage source 12, and the emitter-collector circuits of two transistors 13 and 14, forming an AND gate, are connected in series with each other and the source 12. The base 13b of transistor 13 is connected, via resistor 15, to one end of the secondary 10' transformer 10, the other end of the secondary being connected to source 12. The base 14b of transistor 14 is connected, via resistor 16, to one end of the secondary 11' of transformer 11, the other end of the secondary being connected to the collector 13c of transistor 13.

When the normal power source is in operation, transistor 13 acts as a switch operating in voltage synchronism with the normal source. Thus, when the voltage at one end 17 of secondary winding 10' goes negative with respect to the voltage source 12, transistor 13 is turned on because it is supplied with base drive. Base current can flow from the emitter 13e of transistor 13 to base 13v, through resistor 15 and transformer winding 10', back to emitter 13e. Consequently, transistor 13 is fully on and the voltage at collector 13c is virtually equal to that at source 12. However, when the polarity of the normal power source reverse, point 17 becomes positive with respect to source 12 and transistor 13 turns off. This occurs because the base to emitter junction of transistor 13 is reverse biased and no base current can flow. With transistor 13 turned off, no collector current can flow, and the voltage at collector 13c drops to a very low value. Diode 20 is incorporated to limit the reverse voltage thereby preventing the emitter-base junction of transistor 13 from breaking down. Resistor 15 limits the base current to a safe value.

The solid line in FIG. 2a represents the normal source input voltage to transformer 10. As this voltage goes alternately positive and negative, the voltage at collector 13c (FIG. 2b)

varies from the value of source 12 to almost zero volts, in the form of a square wave that is almost perfect synchronism with the normal source. Each change of voltage at collector 13c occurs when the applied normal source voltage goes through zero volts.

Operation of transistor 14 is similar to that of transistor 13 just described. If emitter 14e were connected to source 12, the square wave at collector 14c (FIG. 2c) would be identical to the waveform at collector 13c, except that it would be in synchronism with the standby source voltage. The standby source voltage is shown in broken lines in FIG. 2a, and is out of phase with the normal source voltage. Hence, the square waves of FIGS. 2b and 2c are correspondingly out of phase.

However, since emitter 14e is actually connected to collector 13c, the voltage waveform at emitter 14e is as shown in FIG. 2b. Transistor 14 conducts only when transistor 13 is on and the standby source voltage is of the same sign as the sign of the normal source voltage which caused transistor 13 to turn on. In the present example, therefore, transistor 14 conducts only when the normal source voltage and the standby source voltage are both positive, and transistor 14 stops conducting as soon as the voltage of either source goes negative. The normal source voltage going negative is enough to inhibit conduction of transistor 14 since at that time transistor 13 turns off (compare FIGS. 2a and 2b). If the normal and standby source voltages should be in phase, the voltage waveform at collector 14c will be identical to that of FIG. 2b. In terms of time, this means that for a 60 Hz. source frequency, transistor 14 can be on for a maximum of 8.333 milliseconds.

It will be appreciated that the width of the square wave at collector 14c (FIG. 2d) is directly proportional to the amount of phase displacement existing between the normal and standby voltages. With these two voltages in phase, the square wave has a maximum width, i.e., transistor 14 conducting for a maximum period. With the two voltages out of phase by 180°, the square wave has a width of zero milliseconds, i.e., transistor 14 does not conduct. Hence, the phase difference between the normal and standby voltages can be determined by measuring the time during which transistor 14 is conducting i.e., measure the duration of the square wave at collector 14c.

The square wave duration is measured by a timing network, including a variable resistor 23 and a capacitor 24 connected in series with each other and with collector 14c, and a voltage sensitive detector, which in the present example is shown as a unijunction transistor 25, the emitter 25e of which is connected to the junction between resistor 23 and capacitor 24. Transistor 25 serves as a voltage reference and pulse amplifier. When a DC voltage is applied to the resistor 23- capacitor 24 network, the voltage across capacitor 24 rises, and this voltage is illustrated in FIG. 2e. With a stable applied voltage from source 12, a stable charging resistor 23 and charging capacitor 24, the instantaneous voltage across capacitor 24 will always be related to the charge time allowed, or in this example the duration of the voltage at collector 14c. When the standby and normal source voltages move closer to an in-phase relationship than is shown in FIG. 2a, i.e., movement of the standby source voltage toward the left, the voltage at emitter 25e will rise to a value sufficient to cause conduction between emitter 25e and base 25b of transistor 25 (see FIG. 2f), capacitor 24 discharges through emitter 25e, base 25b, and resistor 26. The resulting voltage across resistor 26 is a narrow pulse, as shown in FIG. 2g. Thus, a pulse appearing across resistor 26 is an indication that capacitor 24 has been charged for some predetermined time, and thus is an indication of the relative phase between the normal and standby source voltages.

Assuming that the in-phase monitor of this invention is to operate only when the standby source voltage leads or lags the normal source voltage by 10 electrical degrees, i.e., providing a "window" of 20 electrical degrees, the charging resistor 23 is adjusted so that transistor 25 fires exactly $8.333 \times 10^{-3} - 10 \times 46.3 \times 10^{-6}$ or 7.87 milliseconds after transistor 14 conducts and a voltage appears at collector 14c (FIG. 2d). If the square wave width at collector 14c is not of sufficient duration, the voltage across charging capacitor 24 does not rise high enough to fire transistor 25. When the voltage at collector 14c drops because transistor 13 or 14 turns off, the voltage across capacitor 24 also drops until the next time transistors 13 and 14 are both on.

In order to insure that capacitor 24 starts charging from the same voltage level each time transistor 14 conducts to thereby maintain repetitive accuracy, the leading edge of the square wave at collector 14c is differentiated by capacitor 29 and resistor 30. The narrow differentiating pulse thus produced is applied to the base 31b of transistor 31, serving as a timing capacitor discharge switch, causing transistor 31 to momentarily turn on and completely discharge capacitor 24, as indicted in FIG. 2e. Resistor 32 serves to discharge capacitors 24 and 29 when voltage disappears at collector 14c. Diode 33 prevents base 31b from going too far negative, while capacitor 29 is discharging, thus protecting the base to emitter junction of transistor 31. Resistor 34 is the base stabilization resistor for transistor 31. Resistor 35 serves as a form of temperature compensation for unijunction transistor 25. The manner in which a unijunction transistor functions is well known, and hence will not be described in detail herein.

From the foregoing explanation, it will be seen that whenever the two voltage sources applied to transformers 10 and 11 are within a predetermined phase angle of each other, characterized above as a window, a series of narrow pulses (FIG. 2g) are generated across resistor 26. Adjustment of resistor 23 changes the RC time constant of the resistor 23 and capacitor 24 combination resulting in widening or narrowing of this window. The window is always symmetric about the in-phase condition of the two sources, i.e., the monitor operates within the predetermined phase difference regardless of which voltage source is leading or lagging the other. The series of output pulses across resistor 26 occur for as long as the two voltage sources are within the predetermined phase difference, and these pulses can be utilized in a variety of ways. In the present example, they are used to energize an output circuit for closing a small relay, and keeping the relay closed for as long as output pulses are present across resistor 26. Upon termination of the pulses, the relay opens.

The output circuit comprises a silicon controlled rectifier (SCR) 39 connected in series with a relay coil 40 and source 12, a resistor 41 and a diode 42 each being shunted across coil 40. When a voltage pulse is generated across resistor 26, the gate to cathode circuit of SCR 39 is energized causing the SCR to turn on, resulting in energization of relay coil 40. Once SCR 39 is turned on, it remains on because of the regenerative action within the SCR. A conventional means (not shown), is furnished to turn off SCR 39 when the pulses across resistor 26 terminate so as to deenergize relay coil 40. Turn off may be accomplished by temporarily reverse biasing the SCR, or temporarily interrupting its anode current, or temporarily short circuiting its anode to cathode voltage, all of these techniques being well known. Current is supplied to the anode 39a of SCR 39 via resistor 41 immediately upon receipt of a pulse by gate 39g of the SCR. The resistor 41 circuit is needed, since the inductive nature of coil 40 prevents the immediate flow of current through it to the SCR, and without immediate current the pulse at gate 39g might disappear before the SCR latches on. Diode 42 is used to protect SCR 39 from inductive voltage transients once SCR 39 is turned off.

The manner in which the monitor just described may be combined with a transfer switch to accomplish in-phase transfer of motor loads is illustrated in FIGS. 3 and 4. The transfer switch employed in this example is of the mechanically held, double throw type.

In FIG. 3, the normal or utility source, applied to terminals 45, is functioning, and the standby source 46, which may be the generator of an engine-generator set, is not. The load, represented by motor 47, but which obviously may be many motors and/or other types of equipment, is connected to the normal source through transfer switch contacts 48a and 48b, which are controlled by transfer switch coil 48. This coil also controls contacts 48c and 48d, for connecting motor 47 to standby source 46 when the normal source fails, as well as contacts 48e through 48i. With the normal source operating, normal source voltage relay coil 49 is energized, and its contacts 49a are closed. Source selector relay coil 50 is also energized, via contacts 49a and holding contacts 50a (the way in which coil 50 becomes energized even though its holding contacts 50a are normally open will be described below). Relay coil 50 also controls contacts 50b through 50f. Relay coil 51 is deenergized, this coil controlling contacts 51a and 51b.

Upon failure of the normal source, or reduction in normal source voltage below a specified value, relay coil 49 becomes deenergized and hence contacts 49a open. As a result, coil 50 is deenergized, closing contacts 50d, 50e, and 50f. Closing of contacts 50f initiates starting of the engine which drives standby source generator 46. A delay of one or more seconds may be provided after deenergization of relay 50 and before the engine is started, to prevent operation of the standby equipment during momentary voltage dips and outages which may occur in the normal source.

When the standby source 46 reaches acceptable voltage and frequency, relay coil 51 is energized by the standby source through the now closed contacts 50d and 50e. Upon energization of coil 51, contacts 51a close, and as a result transfer switch coil 48 is energized, the circuit being from source 46, through contacts 50d, 51a, and 48g, coil 48, and contacts 48h and 50e, back to source 46. When switch coil 48 becomes energized, contacts 48a and 48b open, to disconnect motor 47 from normal source terminals 45, and contacts 48c and 48d close to connect motor 47 to standby source 46. Thereafter, coil 48 is deenergized, since its contacts 48g and 48h open. The transfer switch is now in the condition shown in FIG. 4, and is maintained in this condition by the mechanical arrangement of its operating mechanism. Motor 47 is connected to source 46, as is relay coil 51, which remains energized.

During transfer of motor 47 from the normal source to the standby source, as just described, monitor 9 need play no part, since by the time the engine is started and generator 46 is running at acceptable voltage and frequency, the residual voltage of motor 47 will usually have decreased to a low enough value to avoid a harmful inrush current upon connection of the motor to source 46.

When the normal source is restored to terminals 45, and the parts are still in the condition shown in FIG. 4, coil 49 is energized again, causing contacts 49a to close. One of the inputs of monitor 9, corresponding to the primary of transformer 10 of FIG. 1, is connected to the normal source via contacts 49a and lines 54 and 55. The other input to monitor 9, corresponding to the primary of transformer 11 of FIG. 1, is connected to the still running standby source 46, via lines 56 and 57. Assuming the normal and standby source voltages are more than a predetermined amount out of phase, relay coil 40 is not energized. However, relay coil 58 is energized via closed contacts 49a, line 54, normally closed contacts 40a controlled by relay coil 40, coil 58, and line 55. As a result, contacts 58a close, to hold coil 58 energized, and contacts 58b close, which for the moment has no consequence. When the normal and standby source voltages reach the predetermined phase difference, relay 40 is energized, opening contacts 40a and closing contacts 40b. Opening of contacts 40a has no effect, since coil 58 remains energized through contacts 58a. Closing of contacts 40b causes energization of coil 50, via closed contacts 49a, line 54, closed contacts 40b and 58b and line 59.

It is only after energization of coil 50 that the transfer switch operates to transfer motor 47 from the standby source to the normal source. This happens because coil 50, when energized closes contacts 50b and 50c, and as a result, switch coil 48 is energized by the normal source through closed contacts 50b and 48e, coil 48, and closed contacts 48f and 50c. Consequently, contacts 48c and 48d open, disconnecting motor 47 from source 46, and contacts contacts 48a and 48b close, connecting motor 47 to normal source terminals 45. In addition, contacts 48e and 48f open, deenergizing coil 48, and the transfer switch is mechanically held in its new position. Energization of coil 50 also causes contacts 50f to open, whereby the standby engine-generator set shuts down. Coil 50 remains energized through holding contacts 50a.

If when the normal source is first restored, the normal and standby source voltages are in phase, or close to being in phase, relay coil 40 is energized at once opening its normally closed contacts 40a. As a result, coil 58 cannot be energized, and hence coil 50 is not energized nor is switch coil 48 energized. It is only when the normal and standby source voltages go out of phase sufficiently to allow coil 40 to become deenergized that coil becomes energized. Thereafter, when the two source voltages come to the predetermined out-of-phase relationship, coil 40 is energized again, and the transfer switch operates as described above. Thus, the presence of coil 58 insures that the signal for operating the transfer switch occurs only when the two source voltages first move into the predetermined range of phase difference from outside that range, so that by the time the transfer switch actually transfers to connect motor 47 to the normal source, the residual motor voltage will be substantially in phase with the normal source voltage.

It is possible that after motor 47 has been transfered to standby source 46, and the parts are as shown in FIG. 4, source 46 might fail. When the normal source is restored, coil 50 cannot be energized by means of monitor 9 since standby generator 46 is not running and hence the monitor is inoperative. However, in this circumstance, coil 50 is energized via contacts 51b, 48i, and 49a. The latter contacts are closed since coil 49 is energized as soon as the normal source is restored. Contacts 48i are closed, as indicated in FIG. 4, and contacts 51b close as soon as coil 51 is deenergized, which occurs when source 46 fails. Upon energization of coil 50, switch coil 48 is energized as described above, and the motor is transferred to the now operative normal source.

Several variations and modifications can be made in the circuitry described above. For example, although the circuits shown all operate automatically, a manual control can be included so that in-phase transfer can take place only when an operator is present to actuate the control. In addition, a manual control can also be incorporated to by-pass the monitor 9, should the latter become inoperative, to permit transfer. Furthermore, although only transfer from the standby to the normal source has been described, it is apparent that in-phase transfer in both directions can be provided for. Also, the invention is not limited to a utility-standby generator arrangement. It can also be used between two separate generators serving as alternative or redundant supplies for an extremely vital line, to insure that power is supplied to the line continuously. In such a case, any hint of impending failure of the generator in operation would cause in-phase transfer to the other generator.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An in-phase monitor comprising
   a. first input means to which a first AC power source is connected;
   b. second input means to which a second AC power source is connected;
   c. means connected to said first and second input means, said means (c) being capable of producing a signal only during periods when the voltages, of both the first and second power sources are of the same relative polarity, and
   d. means responsive to a signal from means (c) of more than a predetermined duration for producing an output signal from the monitor.

2. An in-phase monitor as defined in claim 1 wherein means (c) includes first switch means connected to said first input means for producing a unipolar signal during each alternate half-cycle of said first power source voltage, and second switch means connected to said first switch means and to said second input means for producing a signal only for a period during which it receives said unipolar signal from said first switch means and during which said second power source voltage is of the same relative polarity as said first power source voltage.

3. An in-phase monitor as defined in claim 2 including a DC voltage source, and wherein each of said first and second switch means is a transistor, the emitter-collector circuits of said transistors being connected in series with each other and with said DC source, and the base of each transistor being connected to its respective input means.

4. An in-phase monitor as defined in claim 1 wherein means (d) includes a resistor-capacitor network connected to means (c), the signal from means (c) serving to charge said capacitor, the charge on said capacitor being proportional to the duration of the signal from means (c), and means responsive to a charge on said capacitor of more than a predetermined value for producing the monitor output signal.

5. An in-phase monitor as defined in claim 4 including means for adjusting the value of said resistor to adjust the time required for the charge on said capacitor to reach a predetermined value.

6. An in-phase monitor as defined in claim 4 including means for discharging said capacitor at the beginning of each signal from means (c).

7. An in-phase monitor as defined in claim 1 including a transfer switch having a coil and contacts responsive to energization of said coil for alternatively connecting a load to the first or second AC power source, and a circuit for controlling energization of said coil including means responsive to the output signal from said monitor.

8. An in-phase monitor as defined in claim 7 wherein said control circuit includes a relay coil, and contacts which when closed cause energization of said relay coil, the condition of said last-mentioned contacts being controlled by said monitor, and contacts controlled by said relay coil which alternatively connect said transfer switch coil to said first or second AC power source.

9. An in-phase monitor as defined in claim 8 including means responsive to the output signal from said monitor for inhibiting energization of said relay coil until after means (d) receives a signal from means (c) of less than said predetermined duration, whereby said relay coil can be energized only after the first and second power source voltages have been out of phase more than a predetermined amount.

10. An in-phase monitor as defined in claim 8 including contacts operable independently of said monitor for energizing said relay coil, said independently operable contacts being operated in response to voltage from one of the first and second power sources after a period when said monitor receives no voltage from both of said power sources simultaneously.

* * * * *